United States Patent
Vismara et al.

(10) Patent No.: US 7,494,166 B2
(45) Date of Patent: Feb. 24, 2009

(54) PROTECTIVE STRUCTURE FOR VEHICLES

(75) Inventors: Mario Vismara, Milan (IT); Jean Louis Toneatti, Milan (IT); Alessandro Riva, Milan (IT)

(73) Assignee: ADLEV S.r.l., Milan (IT)

( * ) Notice: Subject to any disclaimer, the term of this patent is extended or adjusted under 35 U.S.C. 154(b) by 160 days.

(21) Appl. No.: 10/958,718

(22) Filed: Oct. 5, 2004

(65) Prior Publication Data
US 2005/0077739 A1 Apr. 14, 2005

(30) Foreign Application Priority Data
Oct. 9, 2003 (IT) ............ MI2003A1944

(51) Int. Cl.
*B60R 19/02* (2006.01)
(52) U.S. Cl. .............. 293/133; 293/120; 293/136; 296/37.2
(58) Field of Classification Search ........... 293/120, 293/121, 132–133, 135–137; 296/37.2
See application file for complete search history.

(56) References Cited

U.S. PATENT DOCUMENTS

| 3,694,019 A | | 9/1972 | Carter |
| 4,762,352 A | * | 8/1988 | Enomoto .................. 293/120 |
| 6,299,226 B1 | * | 10/2001 | Kroning et al. ............ 293/120 |
| 2003/0085591 A1 | | 5/2003 | Seksaria et al. |

FOREIGN PATENT DOCUMENTS

DE 196 04 215 A1 * 8/1996

OTHER PUBLICATIONS

EPO Search Report.

* cited by examiner

*Primary Examiner*—Stephen Gordon
(74) *Attorney, Agent, or Firm*—James V. Costigan; Hedman & Costigan, P.C.

(57) ABSTRACT

A protective structure for vehicles, comprising at least one crosspiece external lined by a bumper strip and attached to a pair of longitudinal side-rails of the chassis of a vehicle by a pair of sacrificial elements. The protective structure also comprises at least one absorption element situated in the space defined by the crosspiece, the sacrificial elements and a bottom wall of the vehicle positioned between the two-side rails.

9 Claims, 3 Drawing Sheets

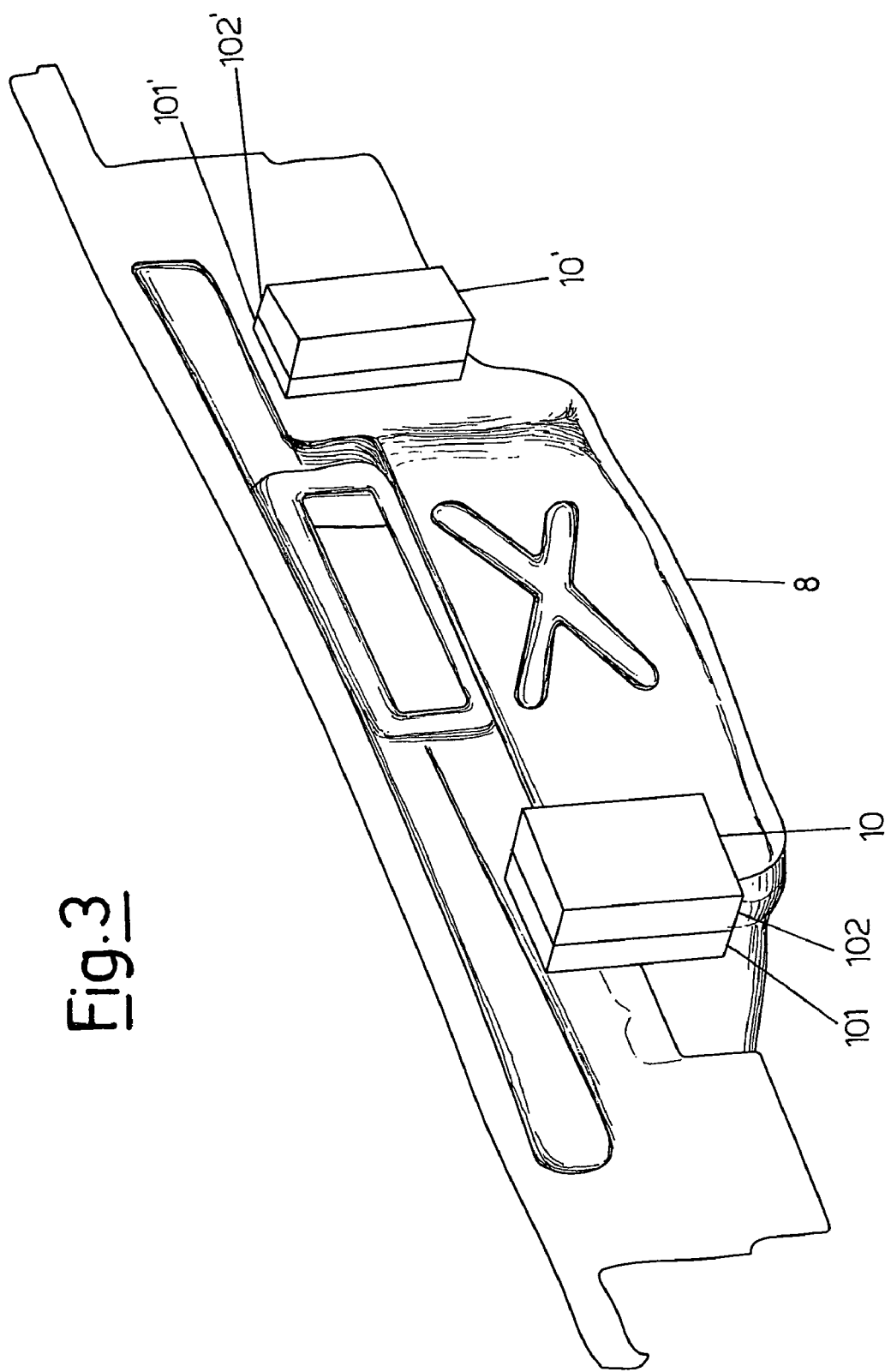

PROTECTIVE STRUCTURE FOR VEHICLES

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISK

Not Applicable

REFERENCE TO A MICROFICHE APPENDIX

Not Applicable

The present invention relates to a protective structure for vehicles suitable for being preferably assembled on the rear side of the vehicle.

BACKGROUND OF THE INVENTION

1) Field of the Invention

The attention of car manufacturers is currently oriented towards reducing the damage that a vehicle undergoes as a result of collisions at relatively low speeds, typically lower than 15-16 Km/h. The protective structure according to the present invention is preferably suitable for impacts having the above characteristics.

The devices used on vehicles for limiting damage during said collisions on the rear side, consist of completely metallic, generally steel, crosspieces, positioned between the vehicle chassis and bumpers; the crosspiece normally rests and is directly fixed to the side-rails, or absorption devices of the metallic type (crash boxes), to which the crosspiece is connected, are fixed to the side-rails. These absorption elements are also known as "sacrificial elements", which, in the case of collision, absorb most of the impact energy by deforming, and at the same time, preventing the deformation of the vehicle chassis.

A protective structure for vehicles of the known type, typically comprises a pair of impact absorption elements, situated in correspondence with the lateral side-rails of the vehicle chassis, on which a crosspiece is assembled over which a bumper strip is superimposed.

The crosspiece is normally made of a metallic material, for example aluminum or steel or plastic, whereas the sacrificial elements can be made of a metallic material or plastic material or a complex of elements made of different materials (honeycomb structures).

The sacrificial elements form the only connection elements between the protective structure of the vehicle with the vehicle chassis itself.

During collision, an impactor will first strike the crosspiece which transfers the load onto the sacrificial elements (in a percentage proportional approximately similar to the impact distance with respect to the two elements).

These structures, for post centered impacts at an equal distance between two sacrificial elements, require extremely rigid crosspieces to be able to transfer the maximum possible force onto the sacrificial elements; this force is defined by the collapse value of the crosspiece. This force, moreover, will then be transferred equally on each side.

If the crosspiece were extremely rigid (which, by nature, is impossible) it would tend to transfer the force without collapsing and consequently deform the two sacrificial elements thus giving a force to the impactor equal to the sum of the collapse forces of the sacrificial elements.

If the force transmitted to each crash box or sacrificial element were light, it would be the crosspiece that would be deformed under the impact.

In order to improve the technical solution, or reduce the intrusion of the obstacle, it is necessary to increase the weight of the crosspiece and consequently of the vehicle.

The Applicant has considered the problem of increasing the resistance of said protective structure without having to reinforce the crosspiece of the structure and therefore without increasing the weight of the vehicle.

BRIEF SUMMARY OF THE INVENTION

The Applicant has found that if the supporting points of the protective structure are distributed to a greater extent on the vehicle chassis, and consequently the energy transmission points due to a collision, the structure becomes more efficient and at the same time distributes the absorption energy onto various points of the vehicle.

DETAILED DESCRIPTION OF THE INVENTION

For this purpose, the Applicant has produced a protective structure for vehicles in which, in the space present between the sacrificial elements which connect the crosspiece with the side-rails of the chassis, further absorption elements are inserted, which connect the crosspiece itself to the vehicle chassis in the area situated between the two side-rails; in particular, these absorption elements are associated with the substantially vertical outer wall, resting on the housing space of the spare wheel situated on the vehicle chassis, thus forming a closure of the chassis.

DESCRIPTION OF THE PREFERRED EMBODIMENT

An aspect of the present invention relates to a protective structure for a vehicle, comprising at least one crosspiece externally lined by a bumper strip and fixed to a pair of longitudinal side-rails of the chassis of said vehicle by means of a pair of sacrificial elements, characterized in that it comprises at least one absorption element situated in the space defined by the crosspiece, the sacrificial elements and a bottom wall of the vehicle positioned between the two side-rails.

The characteristics and advantages of the protective structure according to the present invention will appear more evident from the following illustrative and non-limiting description, referring to the enclosed drawings, wherein:

BRIEF DESCRIPTION OF THE SEVERAL VIEWS OF THE DRAWINGS

FIG. 3 is a perspective view of the protective structure for vehicles according to an alternative embodiment of the present invention. With reference to the above figures, the protective structure for a vehicle according to the present invention comprises at least one crosspiece 2, conveniently externally lined by a bumper strip 3, fixed to a pair of longitudinal side-rails 4 and 4' of the chassis of a vehicle by means of a pair of sacrificial elements 5 and 5'.

Figure 1:
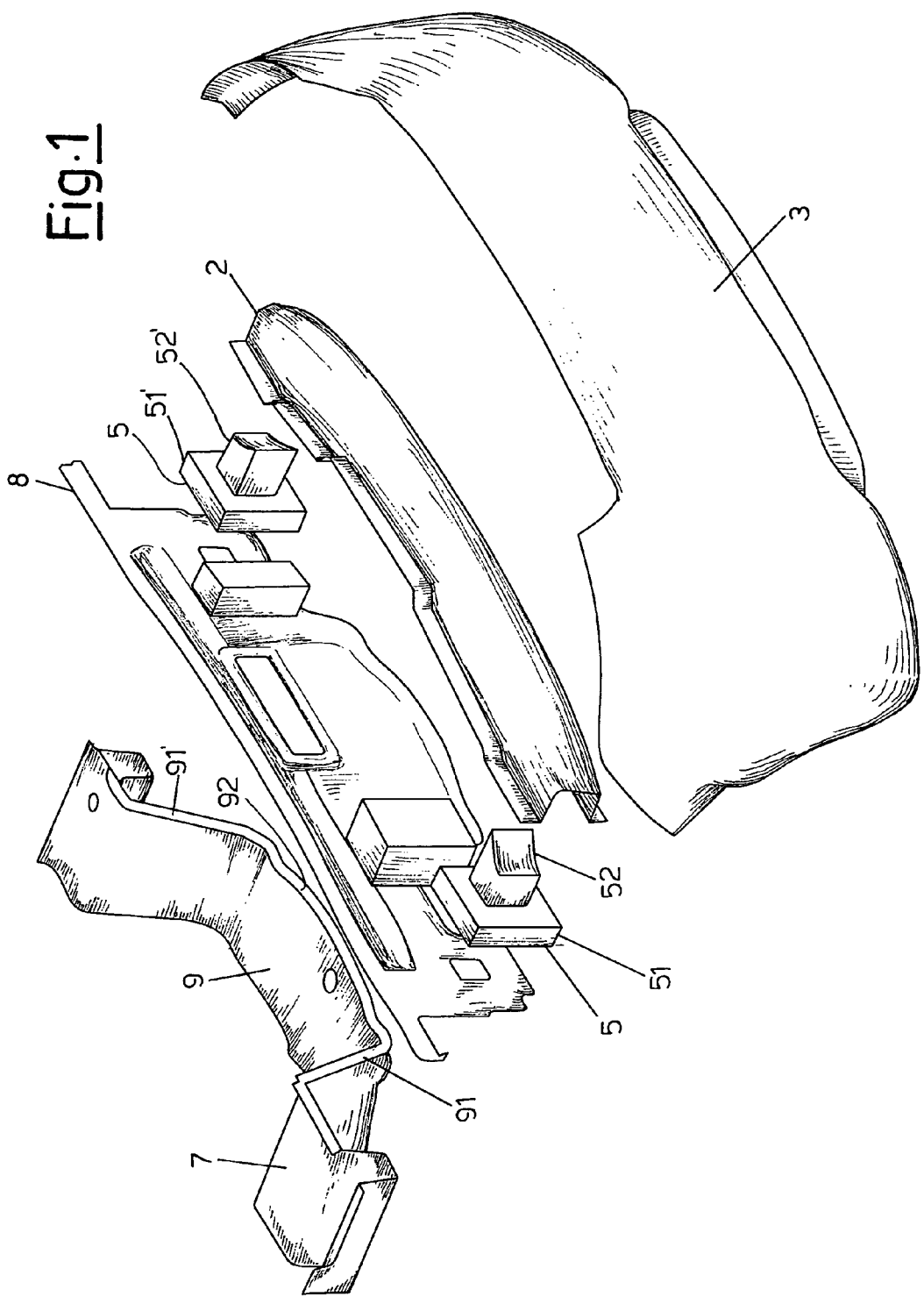
FIG. 1 is an exploded perspective view of the protective structure for vehicles according to the present invention.

The crosspiece 2 is normally made of a metallic or plastic material and is longitudinally shaped as desired according to necessity and space available on the vehicle onto which it is assembled. As far as its transversal section is concerned, this can be "U"-shaped as in the embodiment examples shown in the figures, or of an adequate shape for providing impact resistance (also with a closed section).

The sacrificial elements 5 and 5' can consist of a single piece, of a plastic or metallic material, or they can consist of more than one element, for example a small base or connection plate 51 with the side-rails 4 which surmounts a sacrificial portion 52. Said sacrificial portion consists, for example, of a honeycomb structure made up of a series of elongated elements of a hexagonal transversal section joined together to form a parallelepiped unit.

Between the two lateral side-rails, the rear part of the vehicle has a shaped bottom portion 7 which is preferably fixed to said side-rails. Said shaped bottom portion, in association with a bottom wall 8, forms a space 9 for housing the spare wheel. Said bottom wall 8 is preferably fixed to the head of the two side-rails 4 and 4'.

In order to form said housing space 9, the shaped bottom portion has a pair of slanting surfaces 91 and 91' and a base surface 92 on which the spare wheel of the vehicle rests.

According to the present invention, the protective structure also comprises at least one absorption element situated in the space defined by the crosspiece 2, the sacrificial elements 5 and 5' and the bottom wall 8.

Said absorption element is preferably fixed to said bottom wall 8 and has such dimensions that its surface is substantially in contact with said crosspiece 2.

Figure 2:
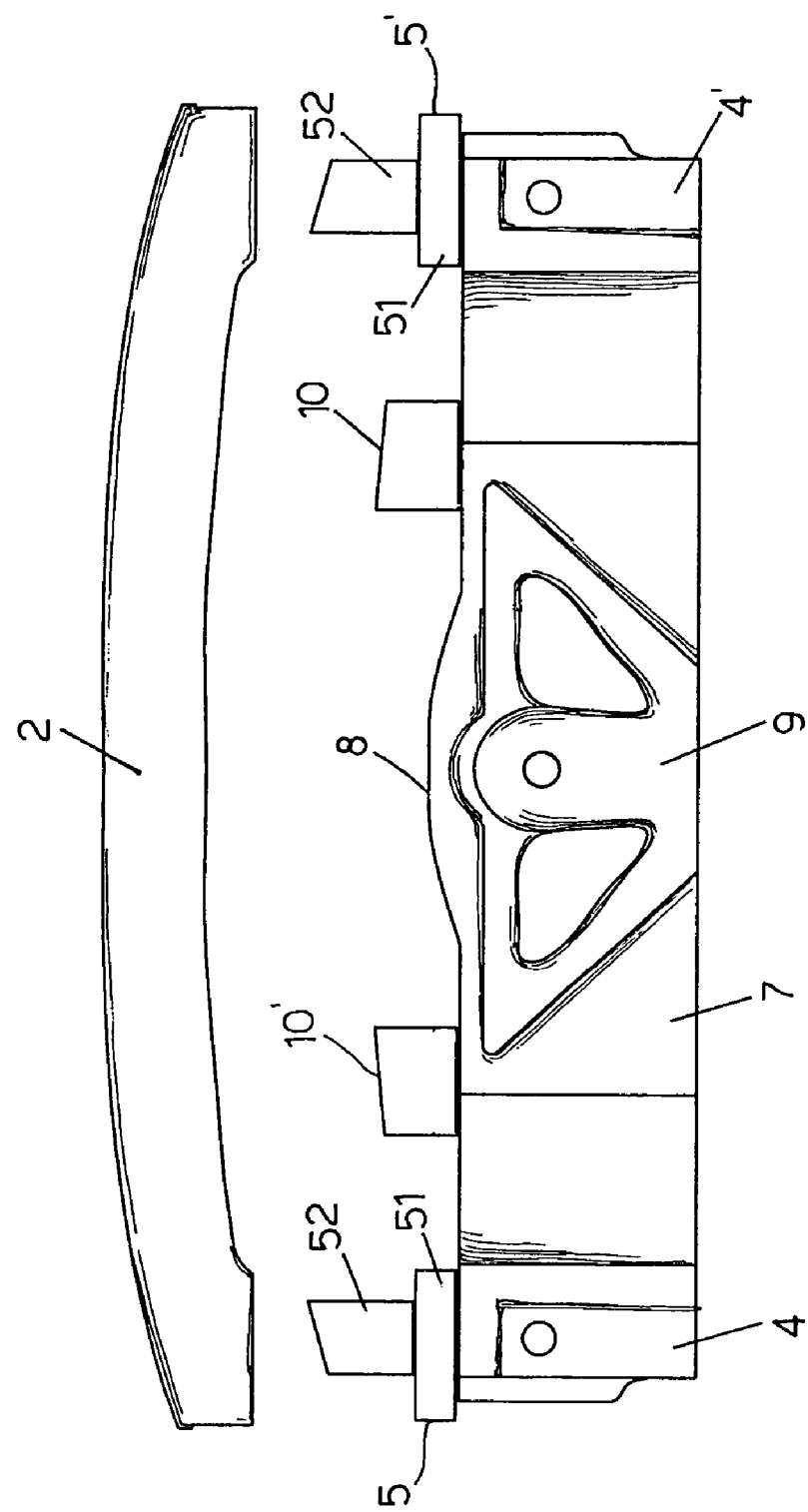
FIG. 2 is a partially exploded view from above of the protective structure for vehicles according to the present invention.

In the embodiment illustrated in FIGS. 1 and 2, there are two absorption elements 10 and 10', having a substantially parallelepiped shape, situated between said crosspiece 2 and said bottom wall; said elements are situated on the bottom wall in correspondence with the slanting surfaces 91 and 91' of the bottom portion 7, as these slanting surfaces provide a wall strengthening area.

The great majority of vehicles currently have this space for housing the spare wheel and consequently, the bottom wall area with a greater resistance to possible impact and therefore to the compression caused by this, lies in correspondence with said slanting surfaces. If the vehicle has such slanting surfaces, the absorption elements are therefore situated in correspondence with these areas.

Alternatively, when the bottom portion is flat and does not have this space, the absorption elements can be distributed at the same distance from each other in the area defined by the bottom wall, the two side-rails and crosspiece.

Any possible impact suffered by the vehicle and consequently a compression strength transmitted by the bumper strip to the crosspiece, is distributed through the sacrificial elements 5 and 5', 4 and 4' and by the absorption elements 10 and 10' onto the bottom wall 8. This wall does not have the same resistance as the side-rails (for example 100 KN on the side-rails and 10÷15 KN on the bottom wall), upon suitably dimensioning said absorption elements 10, however, the bottom wall also contributes to protecting the overall vehicle chassis.

In particular, absorption elements can be used, which reduce their height by 50% if subjected to a compression of 0.2 to 1.5 N/mm².

Plastic materials suitable for producing said absorption elements are: expanded polypropylene, expanded polyurethane, expanded polystyrene, polystyrene.

FIG. 3 illustrates an embodiment of the invention in which said absorption elements consist of a combination of two absorption elements situated adjacent to each other, made of different plastic materials, in order to improve the overall characteristics of the absorption element.

In particular, said absorption element 10 or 10' comprises a first substantially parallelepiped portion 101 or 101' and a second substantially parallelepiped portion 102 or 102', superimposed.

The invention claimed is:

1. A protective structure for a vehicle, comprising
   at least one crosspiece (2) externally lined by a bumper strip (3) and attached to a pair of longitudinal side-rails (4,4') of the chassis of said vehicle by means of a pair of sacrificial elements (5,5'),
   a bottom wall (8), on which said sacrificial elements are positioned, fixed on a head of said rails,
   a shaped bottom portion (7) fixed to said side-rails and associated to said bottom wall (8) wherein
   said bottom wall (8) having a reinforced area realized by means of slanting surfaces (91,91') of said bottom portion (7)
   said structure comprising at least one absorption element situated in a space defined by the crosspiece and the sacrificial elements, said at least one absorption element has a top surface and a bottom surface, said bottom surface is fixed to said bottom wall (8)
   said at least one absorption element is positioned between the two side rails in correspondence with said reinforcing area of said bottom wall.

2. The structure according to claim 1, comprising two absorption elements, each situated close to a side-rail in correspondence with said slanting surfaces.

3. The structure according to claim 2, wherein each of said absorption elements has its top surface, substantially in contact with said crosspiece.

4. The structure according to claim 1, wherein said at least one absorption element is substantially parallelepiped-shaped.

5. The structure according to claim 1, wherein said at least one absorption element is made of a plastic material, said plastic material characterized in having a longitudinal length that can be reduced by 50% when subjected to a longitudinal compression force of 0.2 to 1.5 N/mm².

6. The structure according to claim 5, wherein said at least one absorption element is made of expanded polypropylene or expanded polyurethane or expanded polystyrene or polystyrene.

7. The structure according to claim 5, wherein said absorption element comprises a first portion which is substantially parallelepiped-shaped and a second portion substantially superimposed thereon and made of a plastic material.

8. The structure according to claim 1, wherein the crosspiece is made of a plastic material.

9. The structure according to claim 1, wherein the crosspiece is made of a plastic material, the pair of sacrificial elements and said at least one absorption element are made of a plastic material.

* * * * *